(12) United States Patent
Boomer et al.

(10) Patent No.: US 10,567,214 B2
(45) Date of Patent: Feb. 18, 2020

(54) COMMUNICATION CIRCUITRY AND CONTROL CIRCUITRY THEREOF

(71) Applicant: Cirrus Logic International Semiconductor Ltd., Edinburgh (GB)

(72) Inventors: Alastair Mark Boomer, Edinburgh (GB); Erich Paul Zwyssig, Edinburgh (GB); Gavin Alexander Waite, Edinburgh (GB); Willem Zwart, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/966,631

(22) Filed: Apr. 30, 2018

(65) Prior Publication Data

US 2019/0334756 A1 Oct. 31, 2019

(51) Int. Cl.
*H04L 12/24* (2006.01)
*H04L 7/00* (2006.01)
*H04J 3/06* (2006.01)

(52) U.S. Cl.
CPC ............ *H04L 41/04* (2013.01); *H04J 3/0685* (2013.01); *H04L 7/0008* (2013.01)

(58) Field of Classification Search
CPC ...... H04L 41/04; H04L 7/0008; H04J 3/0685; H04J 3/06; H04J 3/0658; H04J 3/0691; H04J 3/0694; H04J 3/0697; H04J 3/0605; H04J 3/0614; H04J 3/0617; H04J 3/0632; H04J 3/0635; H04J 3/0638; H04B 1/7073; H04B 1/7087; H04B 1/7156; H04B 1/7183; H04B 7/18589; H04B 7/2125; H04B 7/2678; H04B 7/2675; H04B 7/2681; H04B 7/2684; H04Q 2011/0045; H04M 2201/22; H04W 56/0005; H04W 56/001; H04W 56/00; H04W 56/002; H04W 56/0025; H04N 21/4305

See application file for complete search history.

(56) References Cited

U.S. PATENT DOCUMENTS

| 7,814,255 B1 | 10/2010 | Deva et al. |
| 2009/0180465 A1* | 7/2009 | Closset ............... H04L 12/4035 370/350 |
| 2018/0113776 A1 | 4/2018 | Lee et al. |

OTHER PUBLICATIONS

International Search Report and Written Opinion of the International Searching Authority, International Application No. PCT/GB2019/051152, dated Jul. 11, 2019.

* cited by examiner

*Primary Examiner* — Dady Chery
(74) *Attorney, Agent, or Firm* — Jackson Walker L.L.P.

(57) ABSTRACT

Communication circuitry, comprising: N communication nodes being clock-candidate nodes, where $N \geq 2$; N communication units for communication using respective communication protocols, and connected or connectable to receive respective clock signals for communication under their respective communication protocols via respective said clock-candidate nodes; and a control unit configured, in a decision operation, to monitor the clock-candidate nodes and decide which of the communication protocols is in use dependent on at which of the clock-candidate nodes a received clock signal is detected, wherein at least one said communication unit is connected or connectable to receive and/or transmit data under its respective communication protocol via at least one said clock-candidate node other than the clock-candidate node via which that communication unit is to receive its respective clock signal.

23 Claims, 12 Drawing Sheets

COMMUNICATION CIRCUITRY AND CONTROL CIRCUITRY THEREOF

TECHNICAL FIELD

The present invention relates to communication circuitry, in particular to such circuitry which has at least two communication units for communication using respective communication protocols. The present invention also relates to control circuitry for use in such communication circuitry.

BACKGROUND

Communication circuitry is typically for communication across a communication interface using a given communication protocol. Data to be communicated under such a communication protocol may be handled in synchronisation with a clock signal, in which case parallel data and clock paths may be established across the communication interface via respective data and clock communication nodes. Data in this context may include control data.

Communication circuitry finds wide use. Circuitry systems are typically made up of circuitry sub-systems which need to communicate with one another. Example circuitry sub-systems include application processors and processing circuits, for example audio application processors which handle audio data. Of course, audio data is merely one example type of data which may need to be communicated within a data processing system. In the context of circuitry having peripheral input/output components such as sensors/transducers, other examples include video, audio, haptics and/or any other sensor/transducer data.

Such communication circuitry may be implemented on ICs (integrated circuits) or other circuitry systems in a host device, which may be considered an electrical or electronic device. Examples include a portable and/or battery powered host device such as a mobile telephone, an audio player, a video player, a PDA, a mobile computing platform such as a laptop computer or tablet and/or a games device.

The number of communication nodes required becomes an issue particularly in communication circuitry designed to support multiple communication protocols. An advanced digital communication circuit (e.g. implemented on an IC chip) for example typically needs to support a multitude of different communication protocols, where an associated apparatus chooses a subset of them (such as only one of them). Thus, in any one application such a circuit may only need to use a single one of its supported communication protocols. In that case, any communication nodes provided for the ultimately unused communication protocol or protocols may be considered redundant.

Taking forward the example of integrated circuitry, communication nodes may be internal to the communication circuitry concerned in which case the number of communication nodes and corresponding communication paths might only impact circuit layout and area. However, such communication nodes may be external nodes of the integrated circuit, corresponding to connection pins or bond pads/solder balls. The continued miniaturisation of ICs has led to decreasing chip size and decreasing chip package ball count. There is therefore pressure to reduce pin count as technology advances. Potential candidates for pin count reduction are control and data pins.

It is desirable to address the above problems, for example the conflict between supporting multiple communication protocols and reducing the number of communication nodes required.

SUMMARY

According to a first aspect there is provided communication circuitry, comprising: N communication nodes being clock-candidate nodes, where N≥2; N communication units for communication using respective communication protocols, and connected or connectable to receive respective clock signals for communication under their respective communication protocols via respective said clock-candidate nodes; and a control unit configured, in a decision operation, to monitor the clock-candidate nodes and decide which of the communication protocols is in use dependent on at which of the clock-candidate nodes a received clock signal is detected, wherein at least one said communication unit is connected or connectable to receive and/or transmit data under its respective communication protocol via at least one said clock-candidate node other than the clock-candidate node via which that communication unit is to receive its respective clock signal.

By arranging the communication units to receive respective clock signals for communication under their respective communication protocols via respective different clock-candidate nodes, it becomes possible to decide which of the communication protocols is in use dependent on at which of the clock-candidate nodes a received clock signal is detected. This leads to an elegant way to decide which of the communication protocols is in use, and enables clock-candidate nodes to be shared between the communication units.

The control unit may be configured to decide that a particular one of the communication protocols is in use if a clock signal is detected at the clock-candidate node via which the communication unit for that communication protocol is connectable to receive its respective clock signal.

The control unit may be configured to: enable or keep enabled or connect for use the communication unit for which it is decided that its communication protocol is in use; and/or not enable, disable, keep disabled or disconnect each said communication unit other than the communication unit for which it is decided that its communication protocol is in use.

The control unit may be configured to connect the communication unit for which it is decided that its communication protocol is in use to at least one said clock-candidate node, other than the clock-candidate node via which that communication unit is connectable to receive its respective clock signal, to receive and/or transmit data under its respective communication protocol.

The control unit may be configured to monitor the clock-candidate nodes by detecting signal edges at one or more of the clock-candidate nodes. The control unit may be configured to detect that a clock signal is received at one of the clock-candidate nodes based on how many signal edges are detected in the decision operation at said one or more of the clock-candidate nodes, for example by detecting which of those nodes experiences e.g. a given number of signal transitions/edges first.

The decision on which clock-candidate node has the clock signal may depend on the number of signal edges observed, a comparison between counts for different nodes, etc. The decision may also be based on filtering or other mathematical operations on counted values. The period of time taken to make the decision may affect how many signal edges are counted, and this period may be controlled. Similarly, a threshold number of edges to be counted may also be controlled.

The control unit may be configured in the decision operation to count signal edges detected at one or more of the clock-candidate nodes, and detect that a clock signal is received at one of the clock-candidate nodes if the number of signal edges detected at that clock-candidate node reaches a threshold value. For example, the control unit may be configured in the decision operation to detect that a clock signal is received at one of the clock-candidate nodes if the number of signal edges detected at that clock-candidate node reaches the threshold value before the number of signal edges detected at each other clock-candidate node reaches the threshold value.

The control unit may be configured in the decision operation to count signal edges detected at some or all of the clock-candidate nodes, and detect that a clock signal is received at one of those clock-candidate nodes based on a comparison between or a mathematical operation performed on the number of signal edges counted for those clock-candidate nodes. Such a "comparison" could be sufficient to exclude a wrong decision based e.g. on a DDR data signal being present.

The control unit may be configured in the decision operation to count signal edges detected at some or all of the clock-candidate nodes, and detect that a clock signal is received at the one of those clock-candidate nodes for which the higher or highest number of edges is detected.

The control unit may be configured to detect that a clock signal is received at one of the clock-candidate nodes based on how many signal edges are detected in a decision period corresponding to the decision operation.

The control unit may be configured to detect that a clock signal is received at a particular clock-candidate node by detecting that a clock signal is not received at at least another said clock-candidate node.

Each communication unit may be connected to receive and/or transmit data under its respective communication protocol via one or more said clock-candidate nodes other than the clock-candidate node via which that communication unit is connected to receive its respective clock signal.

At least one of the communication units may be connected to receive and/or transmit data under its respective communication protocol via one or more communication nodes of the communication circuitry other than the clock-candidate nodes.

The control unit may be configured to repeat the monitoring and deciding in one or more subsequent decision operations to decide if the communication protocol in use has changed. For example, the control unit may be configured to repeat the monitoring and deciding in one or more subsequent decision operations if it is determined that the existing decision as to which of the communication protocols is in use is no longer valid. The control unit may be configured to cease repeating the monitoring and deciding if it is determined that the existing decision as to which of the communication protocols is in use is correct.

There may for example be a "lock mode". Protocols may have characteristic features during communication to ensure that the protocol is still valid—if such features are not detected, then this may indicate that the protocol has changed, and the monitoring and deciding may then be repeated. If, however, such features are detected in communication, then there may be no need to re-enable or continue the monitoring and deciding.

The control unit may be configured to change which communication unit is enabled or connected for use if it is decided that the communication protocol in use has changed.

The control unit may be configured, based on a signal indicating that a said communication protocol has ceased being in use or has failed to enter normal operation or has failed to acquire synchronisation, to repeat the monitoring and deciding.

The control unit may comprise a detection unit operable to detect a predetermined signal signature at one or more of the clock-candidate nodes or at one or more communication nodes of the communication circuitry other than the clock-candidate nodes, and may be operable to control when a decision operation occurs and/or which clock-candidate nodes are monitored in that decision operation if the signal signature is detected.

Some or all of the communication protocols may be different from one another. Some or all of the communication protocols may be the same as one another.

According to a second aspect there is provided control circuitry for use in communication circuitry, the communication circuitry comprising N communication nodes being clock-candidate nodes, where $N \geq 2$, and N communication units for communication using respective communication protocols, and connected or connectable to receive respective clock signals for communication under their respective communication protocols via respective said clock-candidate nodes, wherein at least one said communication unit is connected or connectable to receive and/or transmit data under its respective communication protocol via at least one said clock-candidate node other than the clock-candidate node via which that communication unit is to receive its respective clock signal, the control circuitry being configured, in a decision operation, to monitor the clock-candidate nodes and decide which of the communication protocols is in use dependent on at which of the clock-candidate nodes a received clock signal is detected.

According to a third aspect there is provided a method of controlling communication circuitry, the communication circuitry comprising N communication nodes being clock-candidate nodes, where $N \geq 2$, and N communication units for communication using respective communication protocols, and connected or connectable to receive respective clock signals for communication under their respective communication protocols via respective said clock-candidate nodes, wherein at least one said communication unit is connected or connectable to receive and/or transmit data under its respective communication protocol via at least one said clock-candidate node other than the clock-candidate node via which that communication unit is to receive its respective clock signal, the method comprising, in a decision operation, monitoring the clock-candidate nodes and deciding which of the communication protocols is in use dependent on at which of the clock-candidate nodes a received clock signal is detected.

According to a fourth aspect there is provided a computer program which, when executed on communication circuitry, causes a control method to be carried out, the communication circuitry comprising N communication nodes being clock-candidate nodes, where $N \geq 2$, and N communication units for communication using respective communication protocols, and connected or connectable to receive respective clock signals for communication under their respective communication protocols via respective said clock-candidate nodes, wherein at least one said communication unit is connected or connectable to receive and/or transmit data under its respective communication protocol via at least one said clock-candidate node other than the clock-candidate node via which that communication unit is to receive its respective clock signal, the control method comprising, in a decision operation, monitoring the clock-candidate nodes and deciding which of the communication protocols is in use dependent on at which of the clock-candidate nodes a received clock signal is detected.

According to a fifth aspect there is provided a (non-transitory) storage medium having the computer program of the aforementioned fourth aspect stored thereon.

BRIEF DESCRIPTION OF DRAWINGS

Reference will now be made, by way of example only, to the accompanying drawings, of which.

DETAILED DESCRIPTION OF EMBODIMENTS

Embodiments relate to communication circuitry configured to support multiple communication protocols, and devices/apparatus comprising such circuitry and associated methods. Such communication circuitry may find particular use in an IC SoC (System on Chip) in a host device.

Merely as a concrete running example, SLIMbus® and SoundWire® are two communication protocols which may be adopted in the audio field. SLIMbus®, or Serial Low-power Inter-chip Media Bus, is a standardised interface for use between baseband or application processors and peripheral components in e.g., mobile terminals (www.mipi.org/specifications/mipi-slimbus). SoundWire® provides a common comprehensive audio interface and scalable architecture that can be used to enable audio features and functions in multiple types of device (www.mipi.org/specifications/soundwire).

Typically, an IC which supports both the SLIMbus® and SoundWire® standards requires 4 pins (2 for SLIMbus® and 2 for SoundWire®) or—if dual-data-lane mode is supported—6 pins (3 for SLIMbus® and 3 for SoundWire®). Therefore, in a case where an IC chip supports both the SLIMbus® and SoundWire® protocols, but only one is actually needed in an end application, 2 or 3 of the IC chip pins may be redundant (and thus wasted) in use.

The circuitry disclosed herein allows for the management or control of how communication nodes (e.g., pins) are used, so that the overall number of such nodes required (e.g., pin count) may be reduced. The techniques disclosed herein allow for such management or control to be carried out efficiently so that the overall associated overhead is relatively modest.

In overview, the general idea employed herein is to arrange the use of communication nodes by communication protocols so that each "looks" to a different communication node for its clock signal. Those communication nodes where a clock signal may be received depending on the protocol used may be considered clock-candidate nodes. By monitoring the clock-candidate nodes, to try to detect a received clock signal, it is thus possible to decide which protocol is in use. A relevant communication unit (for that communication protocol) can then be enabled or connected, and others can be disabled (or kept non-enabled or disconnected).

The regular nature of a clock signal generally enables it to be detected and distinguished from other (e.g., data) signals. One factor of such a regular signal, which will be taken advantage of later herein, is the continual and regular production of signal edges. It may for example be expected that, where a data signal is transmitted in synchronisation with a clock signal, more clock edges than data edges occur in a given period of time. As mentioned above, data signals will be considered herein to encompass all signals (e.g., control signals) other than clock signals.

Figure 1:
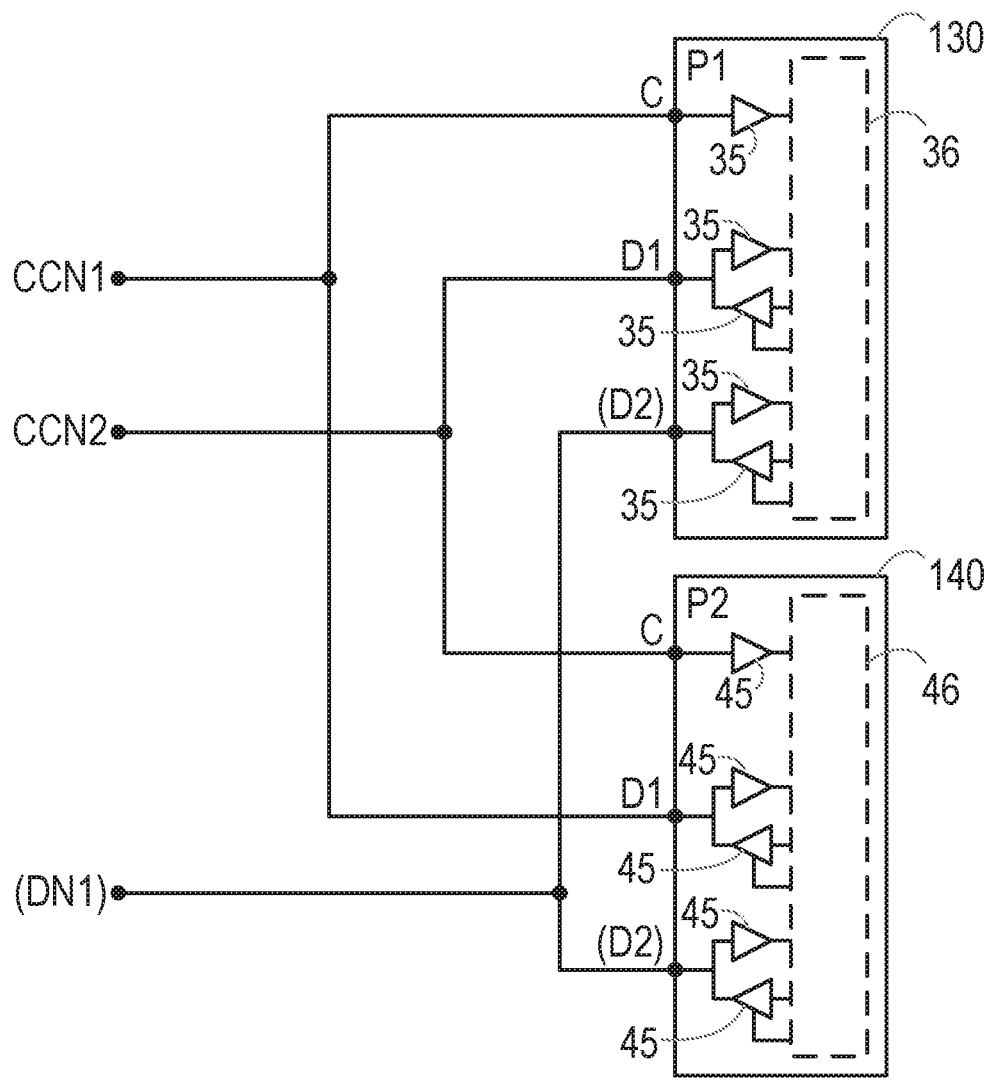
FIG. 1 is a schematic diagram of communication circuitry embodying the present invention.

FIG. 1 is a schematic diagram of communication circuitry 100. Communication circuitry 100 comprises clock-candidate nodes CCN1 and CCN2, a data node DN1 and first and second communication units 130 and 140. The clock-candidate nodes CCN1 and CCN2 and the data node DN1 may be considered communication nodes.

The communication circuitry 100 may be implemented as integrated circuitry, for example on an IC chip along with other circuitry (not shown). The nodes CCN1, CCN2 and DN1 may be external nodes of such an IC chip so that communication connections may be made between the (on-chip) communication units 130 and 140 and other (off-chip) communication circuitry (for example, a communication unit similar to communication unit 130 or 140 but provided on another IC chip in a given communication system).

The communication units 130 and 140 are for communication using respective communication protocols, indicated in FIG. 1 as P1 and P2. The communication protocols P1 and P2 are different from one another in the present arrangement, however in some arrangements they may be the same as one another (knowing which of two identical protocols P1 and P2 is in use may provide some information which can be used to control the communication or some other function). Each of the communication protocols is configured such that information may be communicated over that protocol via an interface comprising a clock channel and one or more data channels. Such channels may be considered communication paths or connections.

Taking communication unit 130 as a representative example, a clock input C and first and second data inputs/outputs D1 and D2 are provided, along with buffers 35 and interface circuitry 36. The clock input C is connected via a buffer 35 to interface circuitry 36 so that a clock signal received at the clock input C is provided thereto. The data input/output D1 is connected via buffers 35 to the interface circuitry 36 so that a data signal may be transmitted and/or received by the interface circuitry 36 via that data input/output. Similarly, the data input/output D2 is connected via buffers 35 to the interface circuitry 36 so that a data signal may be transmitted and/or received by the interface circuitry 36 via that data input/output.

The communication unit 140 has inputs/outputs C, D1 and D2, which correspond respectively to those in communication unit 130, along with buffers 45 and interface circuitry 46 which correspond to the buffers 35 and interface circuitry 36 in communication unit 130, respectively. Thus, duplicate description is omitted.

The interface circuitry 36 is configured for communication under communication protocol P1 whereas the interface circuitry 46 is configured for communication under communication protocol P2. It is assumed that the interface circuitry 36 and interface circuitry 46 are connected to other circuitry (not shown) of the communication circuitry 100 which is configured to operate in cooperation with information exchanged under the relevant protocol.

The clock-candidate node CCN1 is connected to the clock input C of the communication unit 130 and the data input/output D1 of the communication unit 140. The clock-candidate node CCN2 is connected to the data input/output D1 of the communication unit 130 and the clock input C of the communication unit 140. The data node DN1 is connected to the data input/output D2 of the communication unit 130 and the data input/output D2 of the communication unit 140.

Assuming that it is not known in advance which one of the communication protocols P1 and P2 is to be used, the communication circuitry 100 is configured to determine or decide which communication protocol is in use (by an external connected apparatus) based on at which of the clock-candidate nodes CCN1 and CCN2 a clock signal is received. When protocol P1 is in use, a clock signal is received by the communication unit 130 via the clock-candidate node CCN1 and data signals may be transmitted/received by the communication unit 130 via clock-candidate node CCN2 and data node DN1. When protocol P2 is in use, however, a clock signal is received by the communication unit 140 via the clock-candidate node CCN2 and data signals may be transmitted/received by the communication unit 140 via clock-candidate node CCN1 and data node DN1.

In view of the relevant clock signal being received by communication circuitry 100 via clock-candidate node CCN1 or CCN2, the communication units 130 and 140 may be considered to operate as slave units to an external master unit (not shown) providing the clock signal (and thus determining which communication protocol is in use).

It is noted here that the communication units 130 and 140 are connected to receive the clock signals for their respective communication protocols from different clock-candidate nodes CCN1, CCN2. That is, there is a mutually-exclusive (or one-to-one) relationship between the clock candidate nodes CCN1, CCN2 and the protocols P1, P2 in terms of the clock paths. This mutually-exclusive relationship of course may extend beyond just two communication protocols P1, P2 as in FIG. 1. For example, there may be N communication protocols, where N is an integer and N≥2, with N corresponding communication units and clock-candidate nodes.

The clock-candidate nodes are termed as such because, until it is known which communication protocol is in use, it may be that a clock signal is received at any one of them. Once the communication protocol in use is in operation, the clock signal for that protocol will be received via the relevant one of the clock-candidate nodes with the other clock-candidate node or nodes being available for use in carrying a data signal. Indeed, in some arrangements one or more such other clock-candidate nodes may even be available for other communication interfaces. The present disclosure will be understood accordingly.

In FIG. 1, the data node DN1 and corresponding data input/outputs D2 are indicated as being optional. It may be that each of the protocols P1, P2 only requires a single data channel, in which case the clock-candidate nodes CCN1 and CCN2 may be sufficient for the communication of clock and data signals under those protocols. In another example, it may be that only one of the communication protocols P1 and P2 employs two data channels. In other arrangements, more than two data channels may be required by one or more of the communication protocols, in which case more than one data node DN1 (e.g., data nodes DN1 and DN2) may be provided.

The communication protocols P1 and P2 may correspond respectively to the SoundWire® and SLIMbus® protocols mentioned above, which as already explained may be implemented with single data channels or with multiple data channels. These possibilities for communication protocols P1 and P2 are only an example of course, however they will be referred back to later herein for ease of understanding for example in relation to a detailed implementation described in relation to FIGS. 6 and 7.

The data input/outputs D are shown in FIG. 1 as being capable of both inputting and outputting (receiving and transmitting) data signals. Of course, any one or more of them may be just a data input or just a data output depending on the application concerned. Again, the present disclosure will be understood accordingly.

It will be appreciated that control circuitry (although not explicitly shown) is provided to determine or decide which communication protocol is in use, based on detection of a clock signal as mentioned above. Similarly, such control circuitry may control which connections are made between the communication nodes CCN1, CCN2 and DN1 and the communication units 130 and 140 and/or which of the communication units 130 and 140 is enabled. Such details are omitted from FIG. 1 merely for simplicity, but will be considered in more detail later herein.

Figure 2:
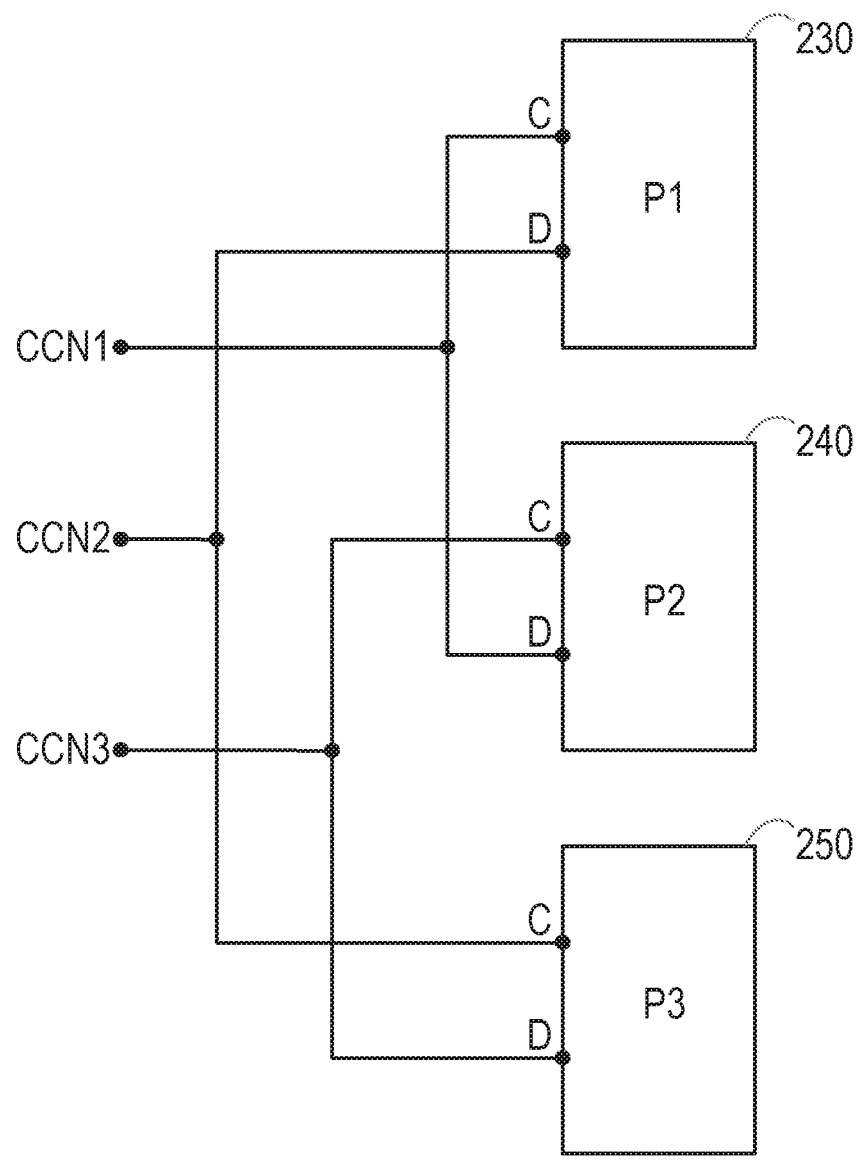
FIG. 2 is a schematic diagram of communication circuitry embodying the present invention.

FIG. 2 is a schematic diagram of communication circuitry 200. Communication circuitry 200 is similar to communication circuitry 100 except that three (rather than two) communication units are provided.

Thus, communication circuitry 200 comprises clock-candidate nodes CCN1, CCN2 and CCN3, and first, second and third communication units 230, 240 and 250. Again, the clock-candidate nodes CCN1, CCN2, CCN3 may be considered communication nodes. Here, no data node equivalent to data node DN1 in FIG. 1 is provided, however it will be understood that any number of such data nodes could be provided in FIG. 2 in addition to the clock-candidate nodes.

The communication units 230, 240 and 250 are for communication using respective communication protocols P1, P2 and P3, and are connected to the clock-candidate nodes CCN1, CCN2 and CCN3 (for clock and data signals) in a similar manner as in FIG. 1. The operation of the communication circuitry 200 will therefore be readily understood based on the operation of the communication circuitry 100, and indeed the communication units 230, 240 and 250 are shown in reduced form for simplicity. Each communication unit expects to receive the clock signal for its communication protocol via a different clock-candidate node as compared to the other communication units. The relevant communication unit and protocol will thus be employed based on at which of the clock-candidate nodes a clock signal is detected.

Figure 3:
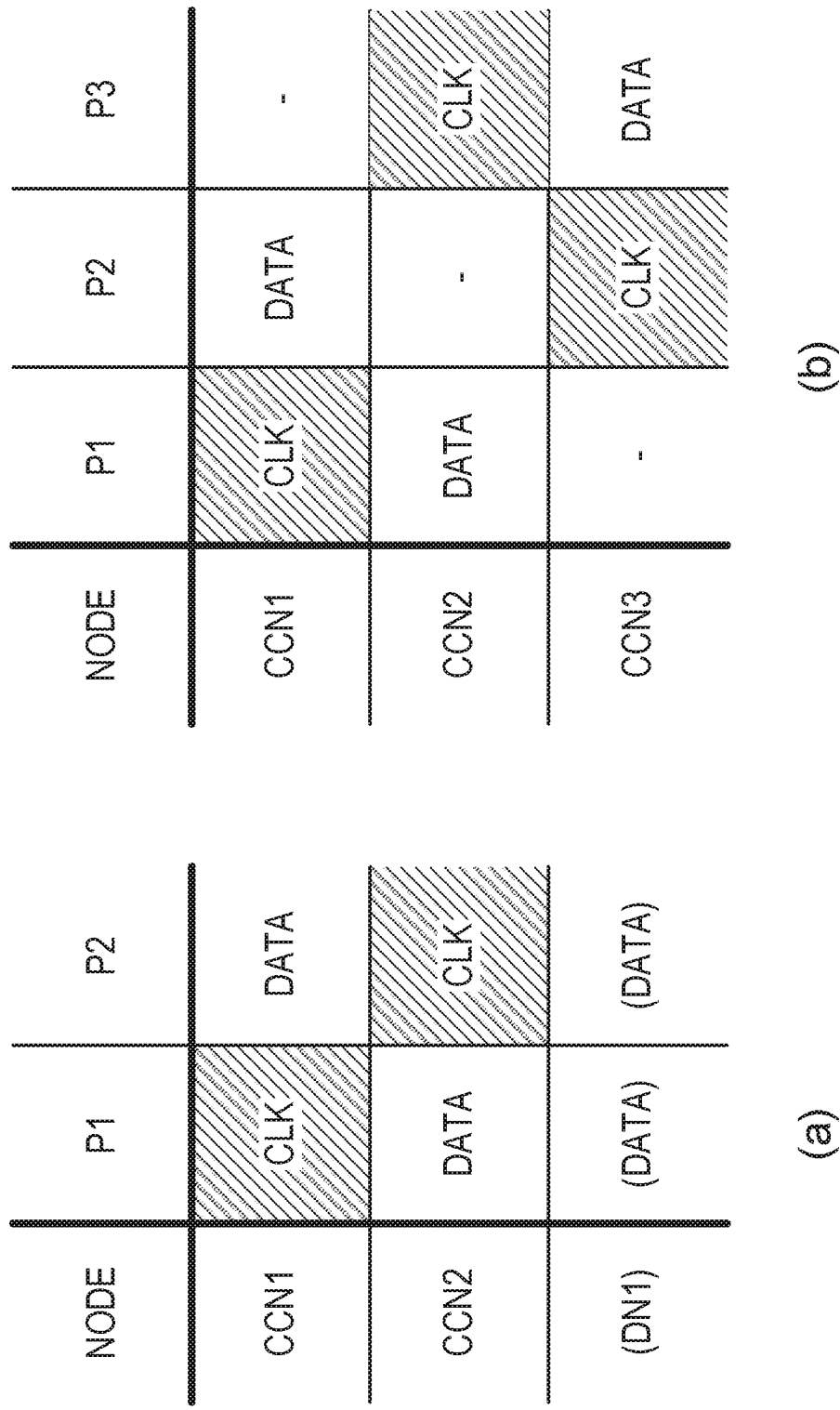
FIG. 3 presents two tables indicating how the communication nodes of FIGS. 1 and 2 may be employed.

FIG. 3 presents two tables summarising how the communication nodes of FIGS. 1 and 2 are employed by the different communication protocols. The table of FIG. 3(a) corresponds to FIG. 1 and the table of FIG. 3(b) corresponds to FIG. 2. In each case, it can be seen (from the highlighting) that each clock-candidate node is connected to receive the clock signal for only one of the relevant communication protocols. For at least one of the protocols, at least one other clock-candidate node is used by that protocol for carrying a data signal. There is thus a degree of "sharing" of clock-candidate nodes between the protocols.

Accordingly, in overview, as long as there are sufficient clock-candidate nodes and corresponding connections such that each communication unit can receive the clock signal for its communication protocol via a different clock-candidate node from that employed by the other communication unit or units, then by detecting at which clock-candidate node a clock signal is received from external circuitry it is possible to determine which communication protocol is in use. In this way, it need not be known in advance which external circuitry is to be provided, in the sense of which communication protocol that external circuitry employs.

Figure 4:
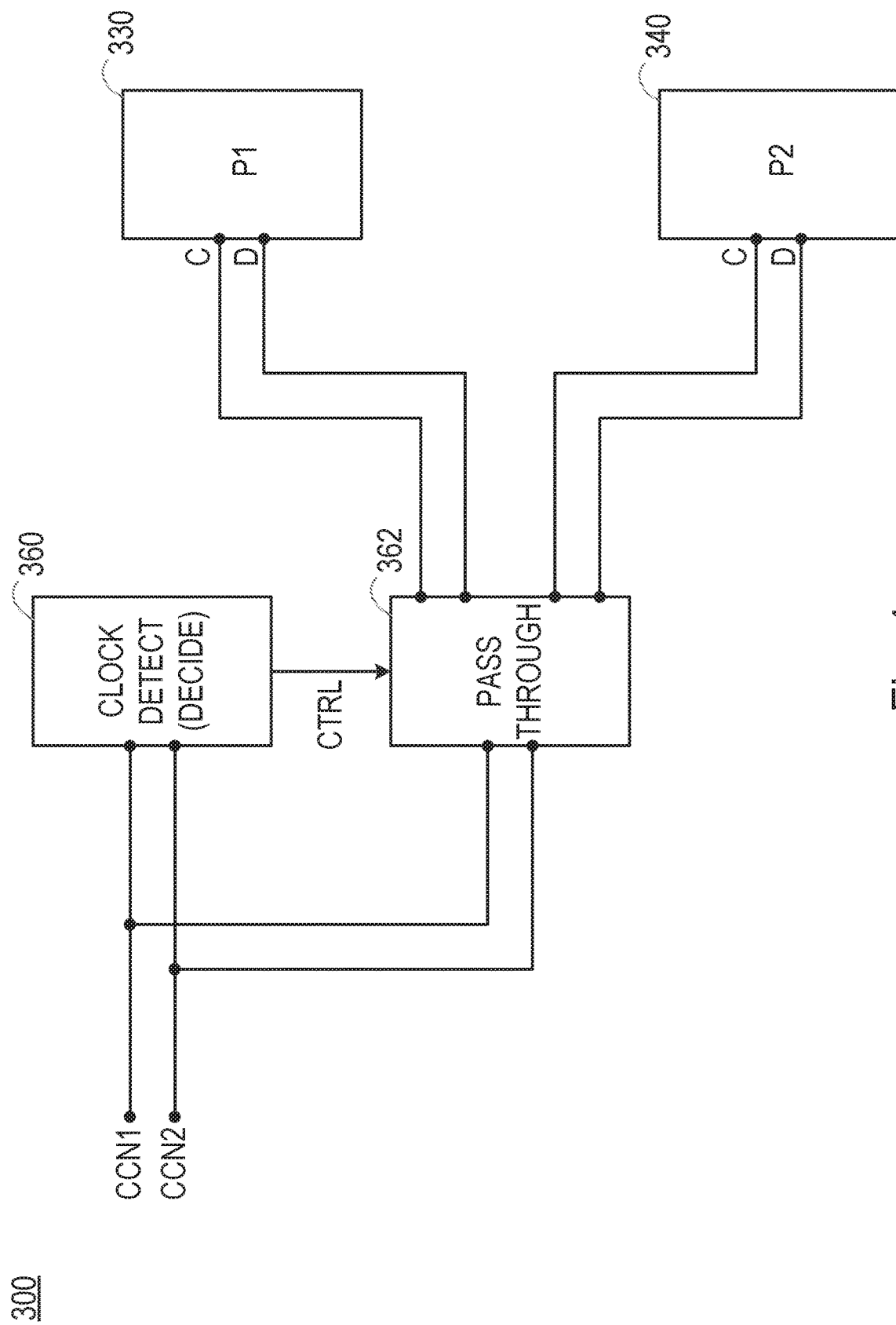
FIGS. 4 and 5 are schematic diagrams of communication circuitry embodying the present invention.
Figure 5:
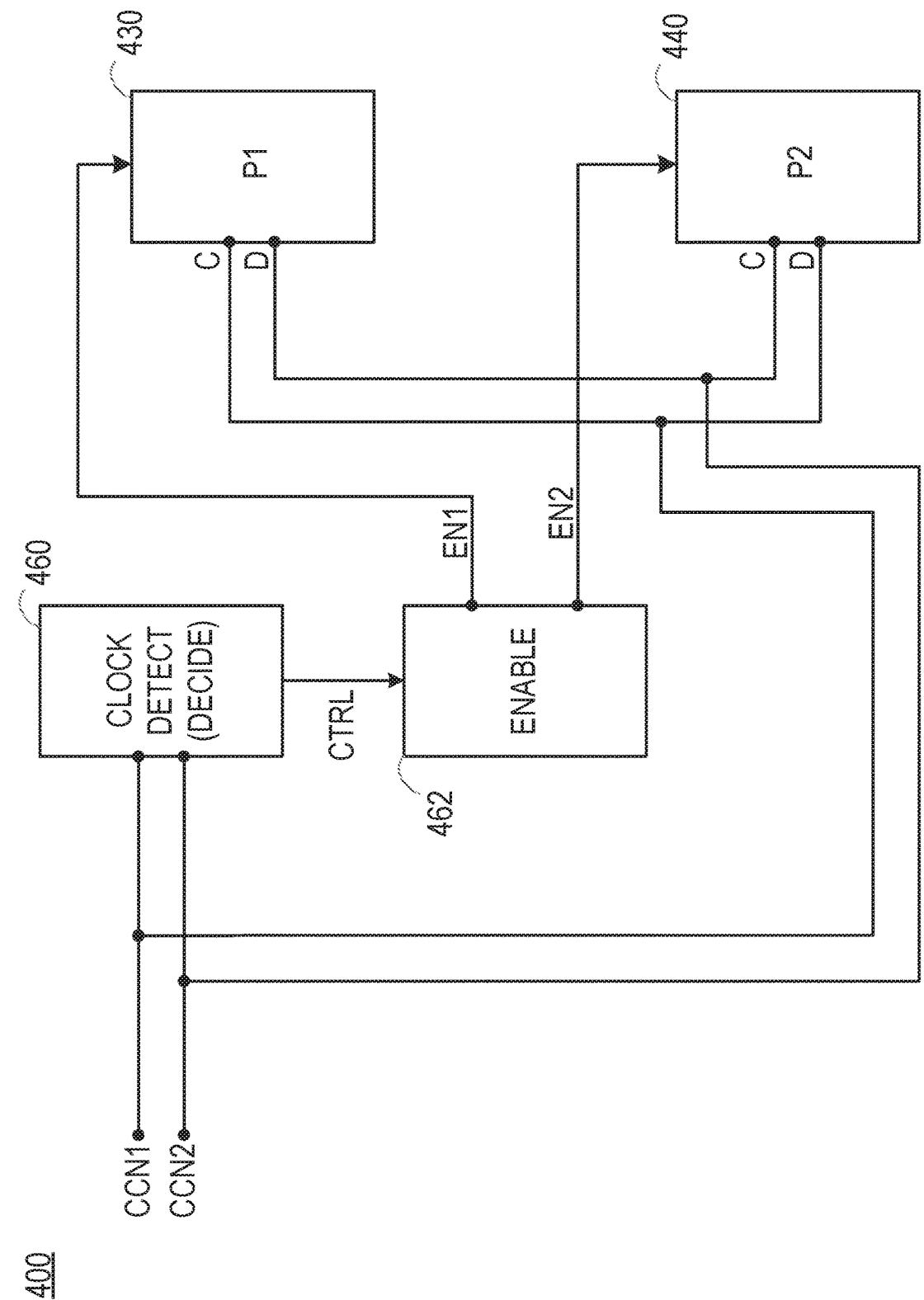

FIGS. 4 and 5 are schematic diagrams of communication circuitry 300 and 400 useful for understanding two possible ways of implementing the control in the communication circuitry 100 of FIG. 1. As such, communication circuitry 300 and communication circuitry 400 may both be considered detailed implementations of communication circuitry 100 in which the control circuitry mentioned above is explicitly shown.

Looking firstly at FIG. 4, the communication circuitry 300 comprises communication units 330 and 340, which correspond respectively to communication units 130 and 140, respectively, and clock-candidate nodes CCN1 and CCN2, as in FIG. 1. Thus, the overall technique of deciding or determining which communication protocol is in use (based on at which of the clock-candidate nodes CCN1 and CCN2 a clock signal is received) as described in relation to FIG. 1 applies equally here and duplicate description is omitted.

As in FIG. 1, only two communication units 330 and 340 and only two candidate communication nodes CCN1, CCN2 are provided in communication circuitry 300. Similar considerations apply when there are more than two such communication units and clock-candidate nodes (recall that the number of such units and nodes may be N, where N≥2). For simplicity, it is assumed in FIG. 4 that there are no data nodes corresponding to data node DN1 in FIG. 1.

The communication circuitry 300 comprises a clock detect unit 360 and a pass-through unit 362, which may together be considered to control which of the communication units 330 and 340, and thus communication protocols P1 and P2, is used. The clock detect unit 360 is connected to monitor any signals received at the clock-candidate nodes CCN1 and CCN2, and to control the pass-through unit 362. The pass-through unit 362 is connected to the clock-candidate nodes CCN1 and CCN2 and also to the clock and data inputs/outputs of the communication units 330 and 340.

The pass-through unit 362 is operable to convey signals either between the clock-candidate nodes CCN1, CCN2 and the clock and data input/outputs of the communication unit 330, or between the clock-candidate nodes CCN1, CCN2 and the clock and data input/outputs of the communication unit 340, dependent on a control signal CTRL received from the clock detect unit 360 as indicated in FIG. 4.

The pass-through unit 362 could also cater in a similar manner for additional connections to any other communication units and also additional connections for any data node (e.g., DN1) to corresponding data input/outputs in line with FIG. 1. For simplicity, as mentioned above, any such additional connections are ignored in FIG. 4.

In detail, the clock detect unit 360 is configured to monitor the clock-candidate nodes CCN1 and CCN2 and to decide which if any of those nodes receives a clock signal. One possible detailed implementation of this functionality, which includes monitoring both of the clock-candidate nodes CCN1 and CCN2 together, will be considered below in connection with FIGS. 6 to 9. However, in some arrangements it may be sufficient to monitor e.g. only one of the clock-candidate nodes (or just a sub-set of them where there are more than two). For example, where there are only two clock-candidate nodes as in FIG. 4 it may be sufficient to monitor e.g. only node CCN1 and if a clock signal is not detected at that node to assume that a clock signal is being provided at node CCN2.

In the present arrangement, if the clock detect unit 360 detects a clock signal at the clock-candidate node CCN1, the clock detect unit 360 decides that the communication protocol P1 is in use and controls the pass-through unit 362 by way of the control signal CTRL to connect the clock-candidate nodes CCN1 and CCN2 to the clock and data inputs/outputs of the communication unit 330 in line with FIG. 1 (in the sense of passing signals between them), and not for communication unit 340. On the other hand, if the clock detect unit 360 detects a clock signal at the clock-candidate node CCN2, the clock-detector unit 360 decides that the communication protocol P2 is in use and controls the pass-through unit 362 by way of the control signal CTRL to connect the clock-candidate nodes CCN1 and CCN2 to the clock and data inputs/outputs of the communication unit 340 in line with FIG. 1.

Looking secondly at FIG. 5, the communication circuitry 400 comprises communication units 430 and 440, which correspond respectively to communication units 130 and 140, and clock-candidate nodes CCN1 and CCN2, as in FIG. 1. Thus, again, the overall technique of deciding or determining which communication protocol is in use based on at which of the clock-candidate nodes CCN1 and CCN2 a clock signal is received applies equally here and duplicate description is omitted.

As in FIG. 1, only two communication units 430 and 440 and only two candidate communication nodes CCN1, CCN2 are provided in communication circuitry 400. However, as mentioned earlier, it will be appreciated that similar considerations apply when there are more than two such communication units and clock-candidate nodes. Also, it is assumed in FIG. 5 as in FIG. 4 that there are no data nodes corresponding to data node DN1 in FIG. 1.

The main difference between communication circuitry 400 and communication circuitry 100 is that the communication circuitry 400 comprises a clock detect unit 460 and an enable unit 462, which may together be considered to control which of the communication units 430 and 440 is used. The clock detect unit 460 is connected to monitor signals received at the clock-candidate nodes CCN1 and CCN2, similarly to the clock detect unit 360, and to control the enable unit 462 using a control signal CTRL.

The enable unit 462 is connected to the communication units 430 and 440, and is operable to control which of them is enabled (or connected), based on the control signal CTRL received from the clock detect unit 460. The enable unit 462 could include connections to any other communication units if provided.

Similarly to the clock detect unit 360, the clock detect unit 460 is configured to monitor the clock-candidate nodes CCN1 and CCN2 and to decide which if any of those nodes receives a clock signal. If the clock detect unit 460 detects a clock signal at the clock-candidate node CCN1, it decides that the communication protocol P1 is in use and controls the enable unit 462 to enable the communication unit 430 with an enable signal EN1 in line with FIG. 1. On the other hand, if the clock detect unit 460 detects a clock signal at the clock-candidate node CCN2, the clock-detect unit 460 decides that the communication protocol P2 is in use and controls the enable unit 462 to enable the communication unit 440 with an enable signal EN2. Thus, unlike in FIG. 4, in FIG. 5 the connections between the clock-candidate nodes CCN1, CCN2 and the communication units 430,440 remain "connected" in either case but the communication units 430,440 themselves are either enabled or disabled.

Incidentally, the enabling functionality of the enable unit 462 may also be provided in the pass-through unit 362 of FIG. 4 with the use of corresponding enable signals EN1 and EN2 so that effectively the functionality discussed in relation to FIGS. 4 and 5 is combined. This could be implemented using logic, gates, or tri-state buffers.

Figure 6:
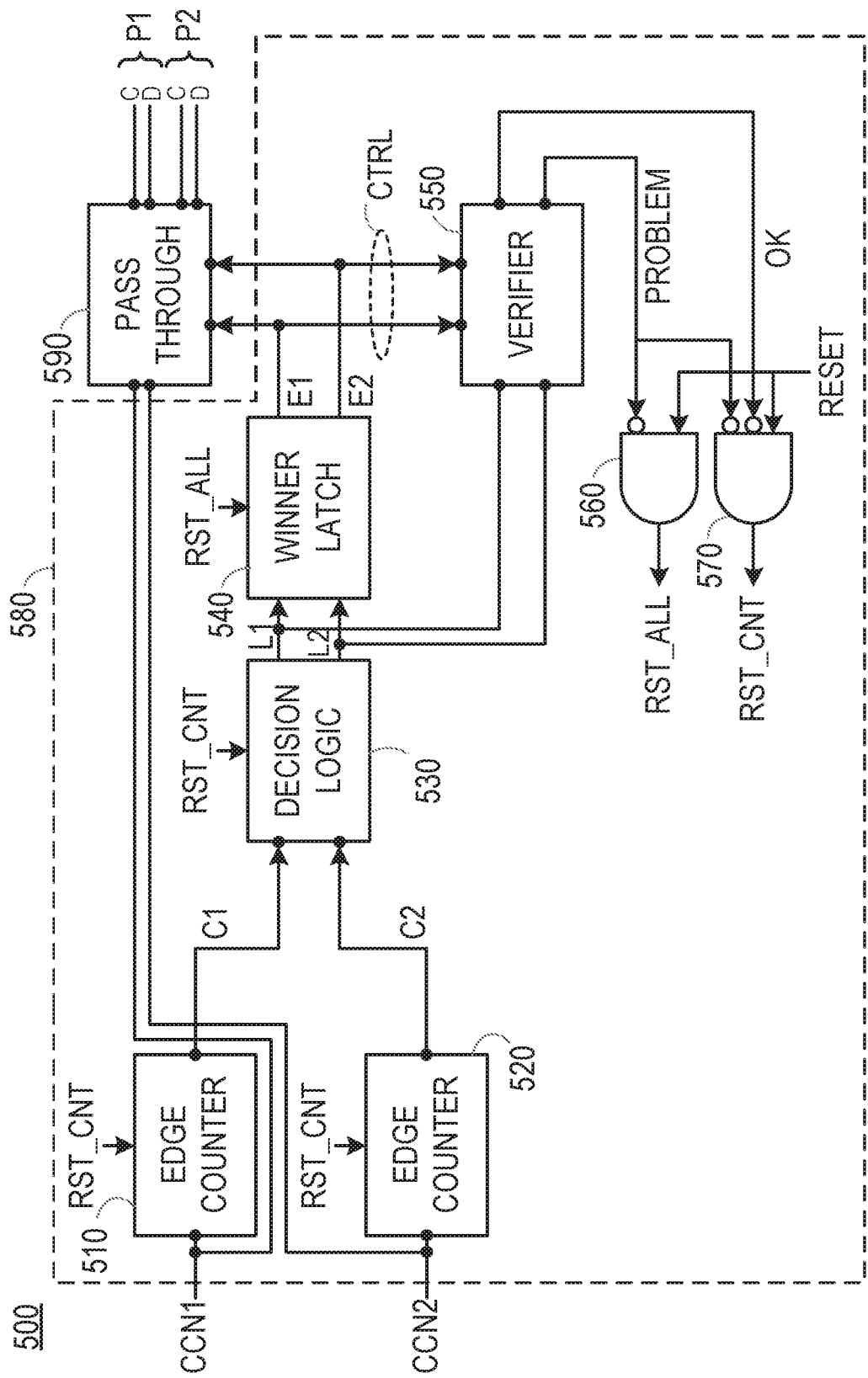
FIG. 6 is a schematic diagram of control circuitry as one detailed implementation of part of the FIG. 4 circuitry.

FIG. 6 is a schematic diagram of control circuitry 500 as one detailed implementation of the combination of the clock detect and pass-through units 360 and 362 of FIG. 4.

Control circuitry 500 comprises edge counters 510, 520, a decision logic unit 530, a winner latch unit 540, a verifier unit 550 and AND-function logic units 560 and 570, which collectively constitute a clock detect unit 580 and correspond to the clock detect unit 360 of FIG. 4. Control circuitry 500 further comprises a pass-through unit 590 which corresponds to the pass-through unit 362 of FIG. 4.

As an aside, the reader will appreciate that for the control circuitry 500 to correspond instead to the combination of the clock detect and pass-through units 460 and 462 of FIG. 5, the pass-through unit 590 could be replaced with an enable unit corresponding to the enable unit 462.

The edge counter 510 is connected to receive a signal from the clock-candidate node CCN1 and to asynchronously count edges of that signal, such as rising edges. Similarly, the edge counter 520 is connected to receive a signal from the clock-candidate node CCN2 and to asynchronously count edges of that signal, again such as rising edges. Of course, falling edges could be counted rather than rising edges. Both edge counters 510 and 520 are connected to be reset by a reset signal RST_CNT so that they may be reset together and thus count up signal edges from a common starting point in time. The edge counters 510 and 520 output respective count signals C1 and C2, indicative of the number of edges counted, to the decision logic unit 530.

As mentioned earlier, the FIG. 6 circuitry will be described with an example application in mind where the communication protocols P1 and P2 correspond respectively to the SoundWire® and SLIMbus® protocols. Thus, if a clock signal is detected at the clock-candidate node CCN1 it will be understood that the SoundWire® protocol is in use as protocol P1 (with data for that protocol expected to pass via clock-candidate node CCN2), and if a clock signal is detected at the clock-candidate node CCN2 it will be understood that the SLIMbus® protocol is in use as protocol P2 (with data for that protocol expected to pass via clock-candidate node CCN1). Of course, in other arrangements other protocols could be used.

The decision logic unit 530 is configured to indicate, for each of the count signals C1 and C2, when that count signal indicates that the number of edges counted has reached a given threshold value, by way of latch signals L1 and L2 corresponding respectively to the count signals C1 and C2. In the present arrangement, the decision logic unit 530 is configured to switch latch signal L1 from logic 0 to logic 1 when the count signal C1 indicates that the relevant threshold value has been reached. Similarly, the decision logic unit 530 is configured to switch latch signal L2 from logic 0 to logic 1 when the count signal C2 indicates that the relevant threshold value has been reached. The threshold values here are assumed to be the same for the count signals C1 and C2, however in some arrangements different threshold values may be applied (or adaptive thresholds may be used if the decision as to which protocol is in use is unclear).

The decision logic unit 530 is connected to be reset also by the reset signal RST_CNT, so that it may be reset at the same time as the edge counters 510 and 520. In the present example it will be assumed that when reset by way of reset signal RST_CNT the latch signals L1 and L2 both adopt a logic 0 value.

Figure 7:
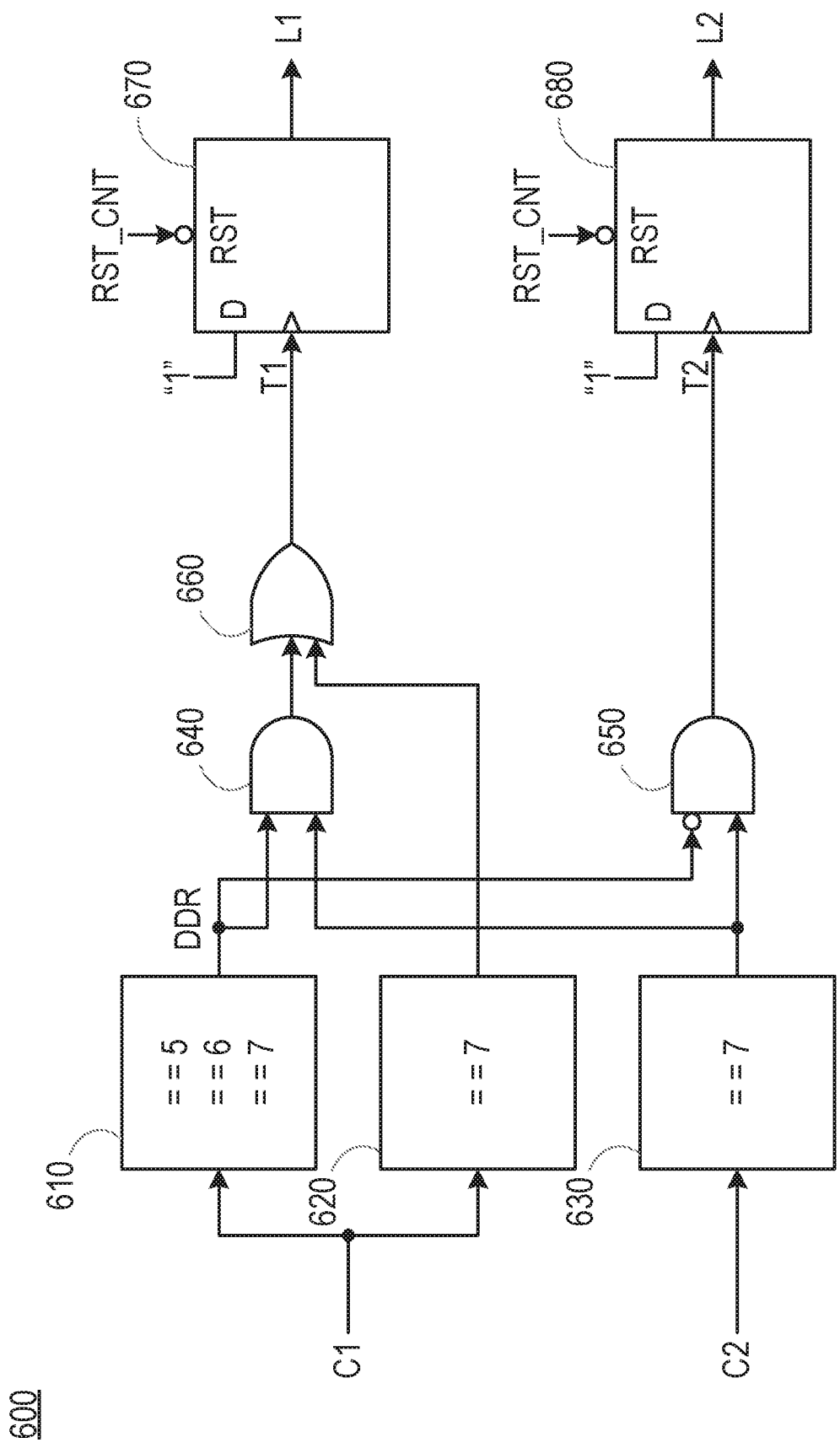
FIG. 7 is a schematic diagram of an example detailed implementation of part of the FIG. 6 circuitry.

FIG. 7 is a schematic diagram of an example detailed implementation 600 of the decision logic unit 530, useful for understanding how that unit functions in the present arrangement. The implementation 600 comprises trigger units 610, 620 and 630, AND-function logic units (AND gates) 640 and 650, an OR-function logic unit (OR gate) 660 and flip-flops 670 and 680.

In overview, the detailed implementation 600 is intended to determine that a clock signal has been detected at one of the clock-candidate nodes CCN1, CCN2 when the corresponding count signal C1, C2 indicates (first) that a threshold value of 7 signal edges has been counted.

However, with the running example in mind where the communication protocols P1 and P2 correspond respectively to the SoundWire® and SLIMbus® protocols, the detailed implementation 600 is also intended to take account of a situation where the SoundWire® protocol (P1) is operating with maximum DDR (double data rate) data, i.e. with its data signal switching between logic 0 and 1 at substantially the same rate as its clock signal. In this case, when the threshold value of 7 signal edges has been detected first at the clock-candidate node CCN1, enabling a (correct) decision that a clock signal for the SoundWire® protocol (P1) is present, it possible that if the counting of edges is then restarted (in order to perform the count again) that the threshold value of 7 signal edges may then be detected first at the clock-candidate node CCN2 (i.e. on the SoundWire® data signal) because of slight timing differences between the SoundWire® clock and data signals. In that case, there is a risk that, simply by looking at the threshold value of 7 signal edges, the (correct) decision that the SoundWire® protocol (P1) is in use may be reversed to an (erroneous) decision that the SLIMbus® protocol is in use. The FIG. 7 circuitry includes functionality to try to avoid such an erroneous decision reversal. It will be appreciated that the functionality effectively serves to compare the count signals C1 and C2 and operate based on the comparison. The count results indicated by the count signals may in general be compared and may be operated on mathematically in order to decide which protocol is in use.

As an aside, the above "counting" technique is simply one convenient technique for detecting DDR data along with the other functionality disclosed herein. However, a dedicated DDR detection circuit could of course be used to detect DDR data.

The trigger unit 610 is configured to output a logic 1 DDR signal (to allow for the case in which a DDR signal is present at the clock-candidate node CCN2) if the count signal C1 indicates that 5, 6 or 7 edges have been counted at the clock-candidate node CCN1. The trigger unit 620 is configured to detect whether a clock signal has been received at the clock-candidate node CCN1, and outputs a logic 1 signal if the count signal C1 indicates that 7 edges have been counted. The trigger unit 630 is configured to detect whether a clock signal has been received at the clock-candidate node CCN2, and outputs a logic 1 signal if the count signal C2 indicates that 7 edges have been counted. Otherwise, the trigger units 610, 620 and 630 output a logic 0 signal.

The logic unit 650 (having an AND-function) is connected to receive the DDR signal output from the trigger unit 610 (at an inverting input) and the output signal from the trigger unit 630. Therefore, provided that 7 edges are counted at clock-candidate node CCN2 before 5 edges are counted at clock-candidate node CCN1, the logic unit 650 will output a logic 1 trigger signal T2 (i.e. with a rising edge) to the clock input of the flip-flop 680 which will cause the latch signal L2 to switch from a logic 0 to a logic 1 (indicating a decision that protocol P2 is in use). Otherwise, the logic unit 650 outputs a logic 0 trigger signal T2 (i.e. without a rising edge) which does not trigger the flip-flop 680.

The logic unit 640 (having an AND-function) is connected to receive the DDR signal output from the trigger unit 610 and the output signal from the trigger unit 630 and to output its output logic signal to the logic unit 660. The logic unit 660 (having an OR-function) also receives the output signal from the trigger unit 620, and outputs a trigger signal T1 to the clock input of the flip-flop 670. Therefore, if 7 edges are counted at the clock-candidate node CCN1 (i.e. before the edge counter 510 is reset), logic unit 660 will output a logic 1 trigger signal T1 (i.e. with a rising edge) which will cause the latch signal L1 to have a logic 1 value (indicating a decision that protocol P1 is in use). Otherwise, the logic unit 660 outputs a logic 0 trigger signal T1 (i.e. without a rising edge) which does not trigger the flip-flop 670. Note that the flip-flops 670 & 680 (or latches) are connected to a logic "1" input signal at their D inputs.

If 7 edges are counted at clock-candidate node CCN2 when 5, 6 or 7 edges are counted at clock-candidate node CCN1 (i.e. where the DDR signal has a logic 1 value), logic unit 640 will output a logic 1 signal which will also cause the latch signal L1 to be a logic 1 (again indicating a decision that communication protocol P1 is in use). This catches the SoundWire® DDR scenario mentioned above, where 7 edges are counted at clock-candidate node CCN2 just before 7 edges have appeared at clock-candidate node CCN1 because of timing issues (i.e. the count at node CCN1 is at 5, 6 or 7 which includes cases where it is at just before 7). In this scenario, the decision that communication protocol P1 is in use is (correctly) made, and moreover by feeding the DDR signal (having the logic 1 value in this case) to the logic unit 650 the (incorrect) decision that communication protocol P2 is in use is prevented.

It will be appreciated here that the value 7 serves as an example threshold value for both of the count signals C1 and C2.

For simplicity, hereinafter the decision as to which communication protocol is in use will be described in relation to FIG. 6 based on at which clock-candidate node the threshold value of signal edges is counted first, ignoring the example DDR scenario discussed above. It will be appreciated that this simpler scenario could be achieved in FIG. 7 by removing units 610, 640, 650 and 660 and connecting units 620 and 630 directly to the flip-flops 670 and 680, respectively.

Note that the flip-flops 670 and 680 are both connected to receive the reset signal RST_CNT at inverting reset inputs, so that when reset by way of reset signal RST_CNT having a logic 0 value (or a corresponding falling edge) the latch signals L1 and L2 both adopt a logic 0 value.

Returning to FIG. 6, the winner latch unit 540 is configured to indicate which of the latch signals L1 and L2 first indicates that the threshold value has been reached, i.e. the winner in terms of counting up to the threshold value (here being 7), by way of enable signals E1 and E2 corresponding respectively to the latch signals L1 and L2. In the present arrangement, the winner latch unit 540 is configured to switch the enable signal E1 from logic 0 to logic 1 when the latch signal L1 is the first of the signals to change from a logic 0 to a logic 1. Similarly, the winner latch unit 540 here is configured to switch the enable signal E2 from a logic 0 to a logic 1 when the latch signal L2 is the first of the latch signals to switch from a logic 0 to a logic 1.

The enable signals E1 and E2 correspond collectively to the control signal CTRL in FIG. 4. Thus, when E1=1 and E2=0 the pass-through unit 590 is controlled to connect the clock-candidate nodes CCN1 and CCN2 respectively to the clock and data input/outputs of the communication unit which operates under the communication protocol P1. On the other hand, when E1=0 and E2=1, the pass-through unit 590 is controlled to connect the clock-candidate nodes CCN1 and CCN2 respectively to the data and clock input/outputs of the communication unit which operates under the communication protocol P2.

The winner latch unit 540 is connected to be reset by a reset signal RST_ALL. In the above example, it will be assumed that when reset by way of reset signal RST_ALL the enable signals E1 and E2 both adopt a logic 0 value. The relationship between the reset signals RST_CNT and RST_ALL will be considered later.

Figure 8:
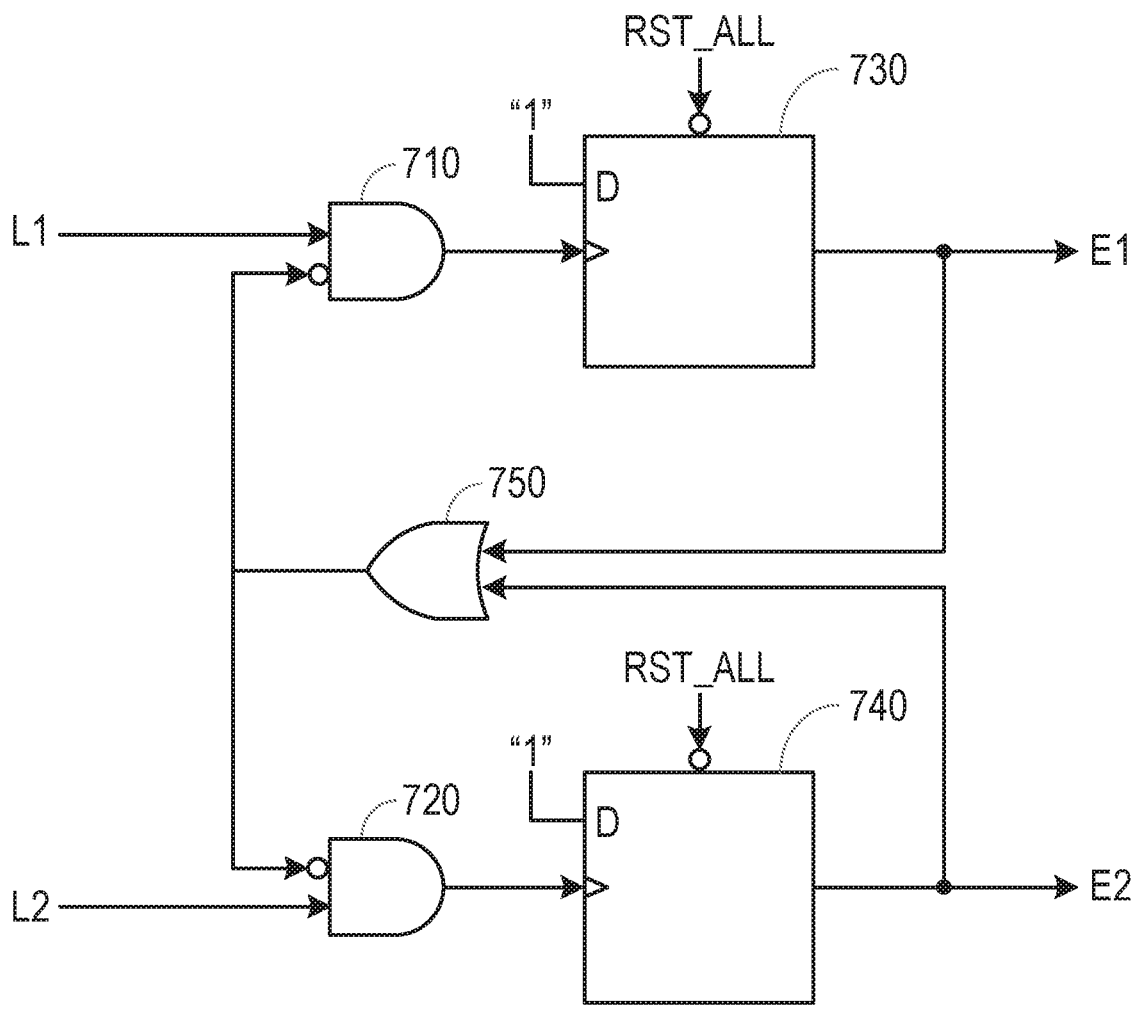
FIG. 8 is a schematic diagram of an example implementation of another part of the FIG. 6 circuitry.

FIG. 8 is a schematic diagram of an example detailed implementation 700 of the winner latch unit 540. The implementation 700 comprises AND-function logic units 710 and 720, flip-flops 730 and 740 and an OR-function logic unit 750. As above, the overall purpose of the winner latch unit 540 is to ensure that only one of the enable signals E1 and E2 has a logic 1 value, representative of a decision or determination that the corresponding clock-candidate node is receiving a clock signal (and thus of which communication protocol is in use). Note that the flip-flops 730 and 740 are provided with an input of logic "1" at their D inputs.

The logic unit 710 (having an AND-function) is connected to receive the latch signal L1 and an output signal from the logic unit 750 (at an inverting input). The logic unit 720 (having an AND-function) is connected to receive the latch signal L2 and an output signal from the logic unit 750 (again, at an inverting input). The flip-flop 730 is connected to receive at its clock input an output signal of the logic unit 710 and to output the enable signal E1. The flip-flop 740 is connected to receive at its clock input an output signal of the logic unit 720 and to output the enable signal E2. The logic unit 750 (having an OR-function) is connected to receive the enable signals E1 and E2.

Note that the flip-flops 730 and 740 are both connected to receive the reset signal RST_ALL at inverting reset inputs, so that when reset by way of reset signal RST_ALL having a logic 0 value (or corresponding falling edge) the enable signals E1 and E2 both adopt a logic 0 value.

Thus, in an initial state, when the flip-flops 730 and 740 have been reset, the enable signals E1 and E2 both have a logic 0 value and a logic 0 value is fed back from the logic unit 750 to the inverting inputs of the logic units 710 and 720. Also, assuming that the flip-flops 670 and 680 have also been reset in the initial state, latch signals L1 and L2 both have a logic 0 value.

In this state, whichever of the latch signals L1 and L2 is first caused to have a logic 1 value by virtue of the operation of implementation 600 (indicating that the threshold value of edges has been counted at the corresponding clock-candidate node—ignoring the DDR scenario mentioned above) will cause its logic unit 710 or 720 to trigger its flip-flop 730 or 740 to cause its enable signal E1 or E2 to adopt a logic 1 value. This logic 1 value on either enable signal E1 or E2 will cause the output of the logic unit 750 (having an OR-function) to become a logic 1 which will then prevent both of the flip-flops 730 and 740 from being further triggered until the initial state is returned to again by way of the resetting as mentioned above. Thus, the winner latch unit 540 serves to ensure that only one of the enable signals E1 and E2 adopts a logic 1 value, the other having a logic 0 value.

The timing of the resetting of the edge counters 510 and 520, the decision logic unit 530 and the winner latch unit 540 affects the overall operation of the control circuitry 500 of FIG. 6. This will now be considered in more detail in conjunction with the verifier unit 550 and the logic units 560 and 570.

Returning again to FIG. 6, the verifier unit 550 is configured to enable the decision made by the decision logic unit 530 and winner latch unit 540 (i.e., which of the enable signals E1 and E2 has the logic 1 value indicating at which clock-candidate node it has been decided that a clock signal has been received) to be revisited to allow for the possibility that a wrong decision has been made.

In overview, the edge-counters 510 and 520 and the decision logic unit 530 carry out their operation as described above repeatedly, between resets. The result of the operation (i.e., which of the latch signals L1 and L2 first adopts a logic 1 value) is compared against the current decision (i.e., which of the enable signals E1 and E2 has the logic 1 value) to see if they agree. If they do agree, then the existing decision is confirmed. If, however, they do not agree, it is possible (or even likely) that the existing decision was a bad one that may need to be reversed. In order to make this comparison, the verifier unit 550 is connected to receive the latch signals L1 and L2 and the enable signals E1 and E2.

In the former case (agreement), the existing decision can be retained and an OK output signal is given a logic 1 value. In the latter case (non-agreement), the decision is retaken and a PROBLEM output signal adopts a logic 1 value, effectively causing resetting of the winner latch unit 540 (along with the edge counters 510 and 520 and the decision logic unit 530) as will be explained in more detail.

Figure 9:
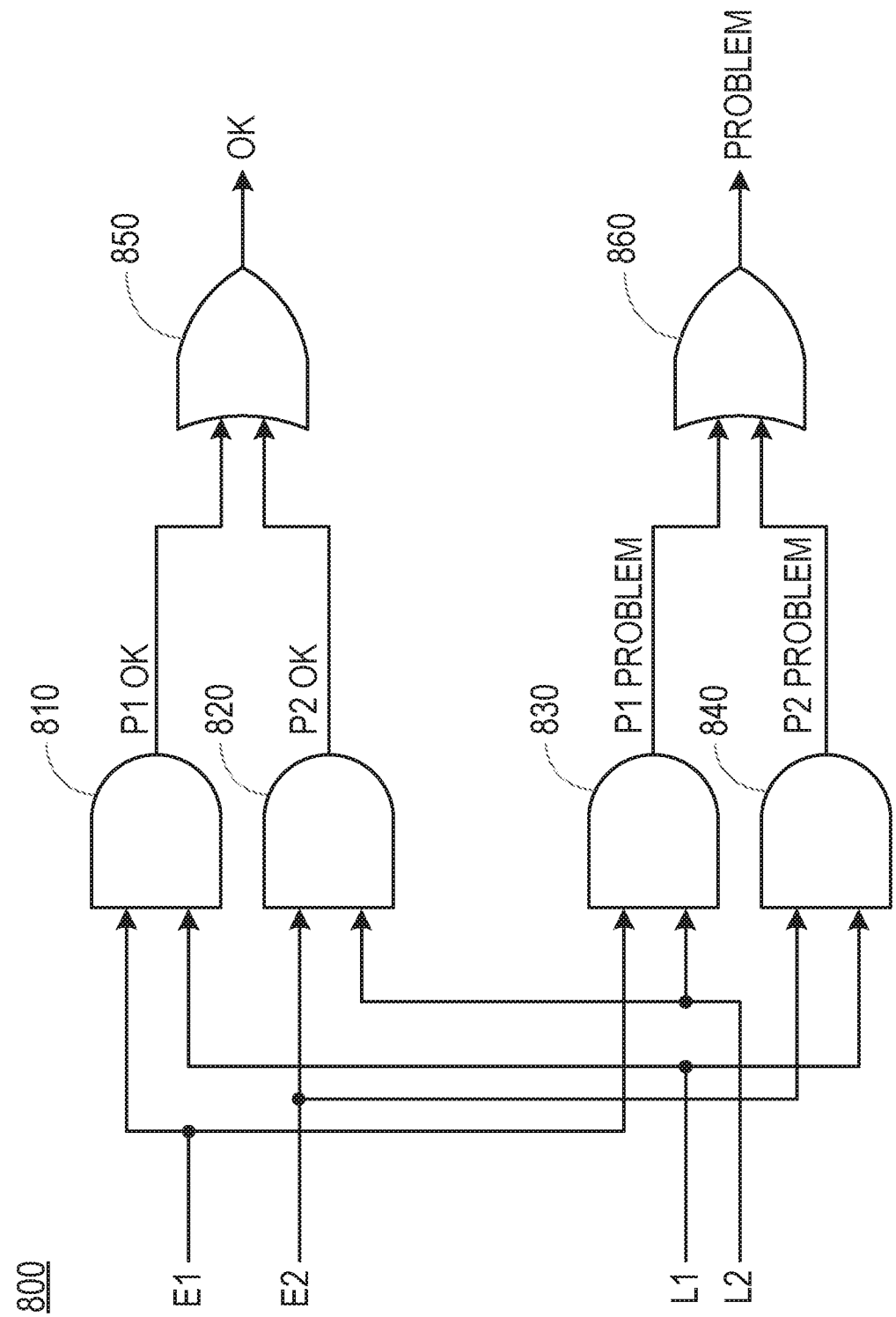
FIG. 9 is a schematic diagram of an example detailed implementation of another part of the FIG. 6 circuitry.

FIG. 9 is a schematic diagram of an example detailed implementation 800 of the verifier unit 550. The implementation 800 comprises AND-function logic units 810, 820, 830 and 840 and OR-function logic units 850 and 860.

The logic unit 810 (having an AND-function) is connected to receive signals E1 and L1, the logic unit 820 (having an AND-function) is connected to receive the signals E2 and L2, the logic unit 830 (having an AND-function) is connected to receive the signals E1 and L2, and the logic unit 840 (having an AND-function) is connected to receive the signals E2 and L1. The logic unit 850 (having an OR-function) receives output signals of the logic units 810 and 820 and outputs the OK signal. The logic unit 860 (having an OR-function) receives the output signals of the logic units 830 and 840, and outputs the PROBLEM signal.

Therefore, if the current decision has enable signal E1 with logic 1 and enable signal E2 with logic 0 (i.e., the decision being that the clock-candidate nodes CCN1 receives the clock signal, and that protocol P1 is in use), and in a repetition of the operation of the edge counters 510, 520 and the decision logic unit 530 the latch signal L1 adopts a logic 1 value first, the logic unit 810 will adopt a logic 1 value (indicating the decision for P1 is OK) and the logic unit 850 will cause the output signal OK to have a logic 1 value. If, however, the latch signal L2 adopts a logic 1 value first, the logic unit 830 will output a logic value 1 (indicating the decision for P1 has a problem) and the logic unit 860 will cause the output signal PROBLEM to have a logic 1 value.

Similarly, if the current decision has enable signal E2 with logic 1 and enable signal E1 with logic 0 (i.e., the decision being that the clock-candidate node CCN2 receives the clock signal, and that protocol P2 is in use), and in a repetition of the operation of the edge counters 510, 520 and the decision logic unit 530 the latch signal L2 adopts a logic 1 value first, the logic unit 820 will output a logic 1 value (indicating the decision for P2 is OK) and the logic unit 850 will cause the output signal OK to have a logic 1 value. If, however, the latch signal L1 adopts a logic 1 value first, the logic unit 840 will output a logic value 1 (indicating the decision for P2 has a problem) and the logic unit 860 will cause the output signal PROBLEM to have a logic 1 value.

Returning again to FIG. 6, the logic unit 560 (having an AND-function) is connected to receive the PROBLEM signal (at an inverting input) and a RESET signal, and to output the RST_ALL reset signal. The logic unit 570 (having an AND-function) is connected to receive the PROBLEM signal (at an inverting input), the OK signal (at an inverting input) and the RESET signal, and to output the RST_CNT reset signal.

Assuming that the default state (unless activated) of the PROBLEM and OK signals is logic 0 (as apparent from FIG. 9), and that the default state of the RESET signal is logic 1, then the default state of the RST_ALL and RST_CNT reset signals is logic 1 (which, as can be seen from the inverting inputs to the flip-flops in FIGS. 7 and 8, does not cause a reset).

If the OK signal is caused to adopt a logic 1 value, the RST_CNT signal will be caused to have a logic 0 value which will reset the edge counters 510 and 520 and the flip-flops 670 and 680 (zeroing the signals C1, C2, L1 and L2, so that they all have a logic 0 value) so that the OK signal is returned to a logic 0 value and the edge counters 510, 520 and the decision logic unit 530 can repeat their operation. This way, the verifier unit 550 can repeatedly verify the decision taken.

If the PROBLEM signal is caused to adopt a logic 1 value, both the RST_CNT and RST_ALL signals will be caused to have a logic 0 value which will reset the edge counters 510 and 520, the flip-flops 670 and 680 (zeroing the signals C1, C2, L1 and L2) and the flip-flops 730 and 740 (zeroing the signals E1 and E2) so that the overall operation described above can be repeated and the decision retaken.

At any time, the RESET signal can be given a logic 0 value to reset the control circuitry 500 outside the case above where there is a problem with an existing decision (again, in this case, both of the RST_CNT and RST_ALL signals will be caused to have logic 0 value).

Figure 10:
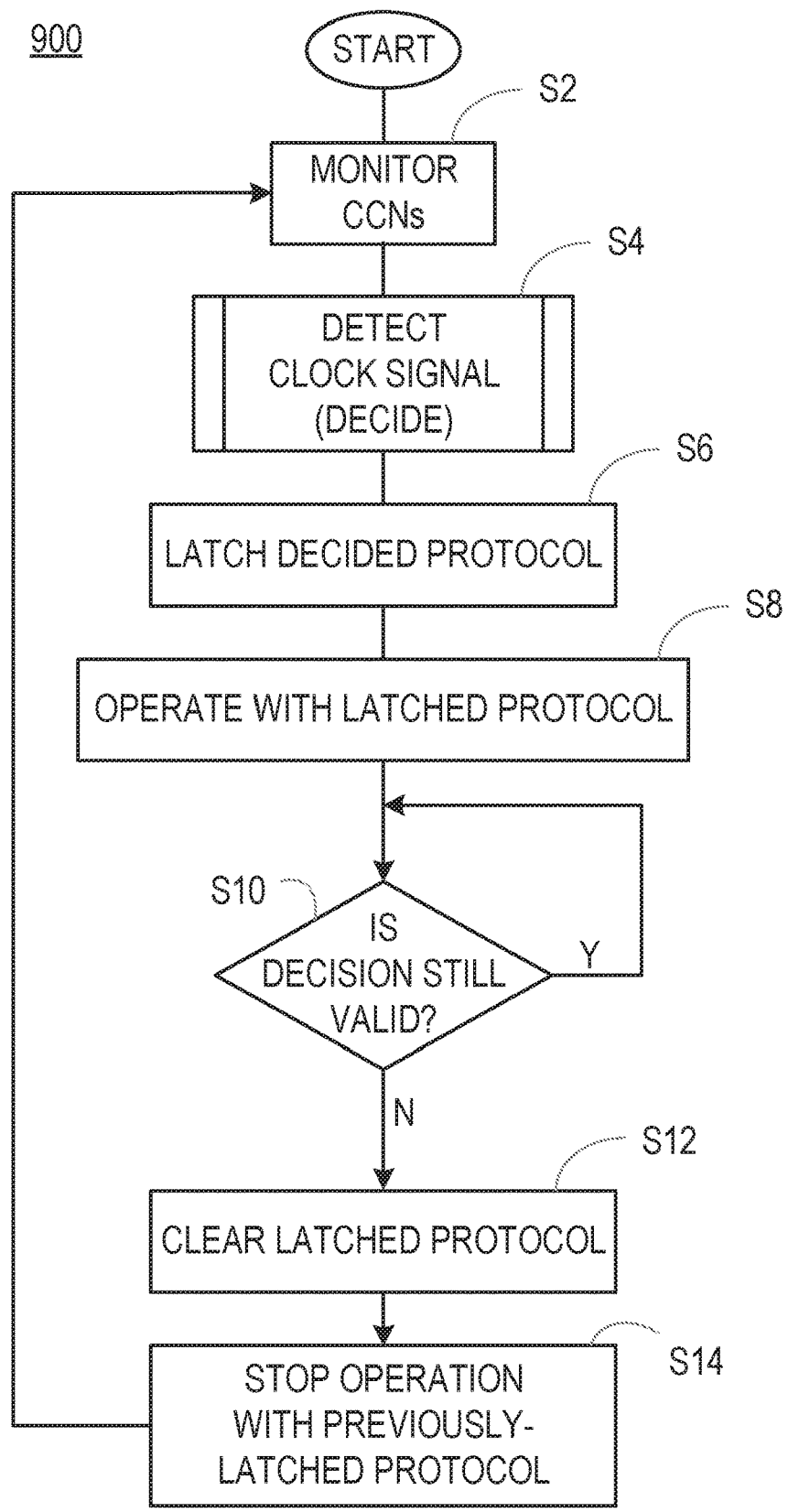
FIGS. 10 and 11 are flowcharts relating to a method embodying the present invention.

FIG. 10 is a schematic diagram of a method 900 which may be carried out by the communication circuitry 300, taking into account the control circuitry 500 of FIG. 6 and the detailed implementations of elements thereof as described in connection with FIGS. 7 to 9.

Method 900 comprises steps S2 to S14. Steps S2, S4, S6, S10 and S12 could for example be performed by the control circuitry 500 itself.

In step S2, the clock-candidate nodes (such as nodes CCN1 and CCN2) are monitored. In this initial state it is assumed that the signals L1, L2, E1 and E2 in FIG. 6 have a logic 0 value. The method proceeds to step S4 in which a clock signal is detected at one of the clock-candidate nodes, based on the monitoring, to decide which communication protocol (such as communication protocol P1 or P2) is in use. This corresponds to one of the latch signals L1 and L2 in FIG. 6 adopting a logic 1 value first.

The method then proceeds to step S6 in which the current decision as to which protocol is in use is "latched", which corresponds to one of the enable signals E1 and E2 in FIG. 6 adopting the logic value 1 as a result of one of the latch signals L1 and L2 adopting a logic 1 value first. The method then proceed to step S8 in which the communication circuitry concerned operates according to the latched protocol. This corresponds to the pass-through unit 590 in FIG. 6 passing signals between the clock-candidate nodes CCN1, CCN2 and the relevant communication unit (not shown in FIG. 6) for the decided communication protocol based on the enable signals E1 and E2.

The method then proceeds to step S10, in which it is determined whether the current decision as to which protocol is in use is still valid. This may correspond to the operation of the verifier unit 550 of FIG. 6, and thus may involve effectively monitoring the clock-candidate nodes as in step S2 to enable new values for latch signals L1 and L2 which can be compared against the enable signals E1 and E2. However, the verification process of step S10 may also involve other functionality, for example to implement some "inertia" in respect of changing which protocol is determined to be in use. Such other functionality may involve for example looking at the data received/transmitted (e.g. over non-clock-candidate nodes) or looking for a trend over a period of time.

If it is determined that the current decision as to which protocol is in use is still valid (S10, YES), the method returns to step S10 and the communication circuitry concerned continues to operate according to the latched protocol. This is accordingly the state in which the system ideally settles in assuming that the decided protocol is the correct one, with the verification of step S10 being repeated e.g. regularly or from time-to-time or for a certain period of time.

If, however, it is determined that the current decision as to which protocol is in use is no longer valid (S10, NO), the method proceeds to step S12.

In step S12, the latched decision as to which protocol is in use is cleared, and the method proceeds to step S14 in which the communication circuitry concerned is controlled to stop operating according to the previously-latched protocol. This corresponds to both of the enable signals E1 and E2 in FIG. 6 adopting the logic value 0. The method then returns to step S2 as if the method is starting for the first time, with the latch signals L1 and L2 in FIG. 6 also having the logic value 0 once more.

Although not shown in FIG. 10, at any time the control circuitry 500 may be reset using the RESET signal, which corresponds to returning to step S2 as if for the first time as mentioned above. This may correspond to a NO decision in step S10, with the RESET signal being used to indicate that the current decision regarding which protocol is in use is no longer valid. Also, at any time the communication circuitry concerned may be disabled in which case the method 900 may terminate.

Figure 11:
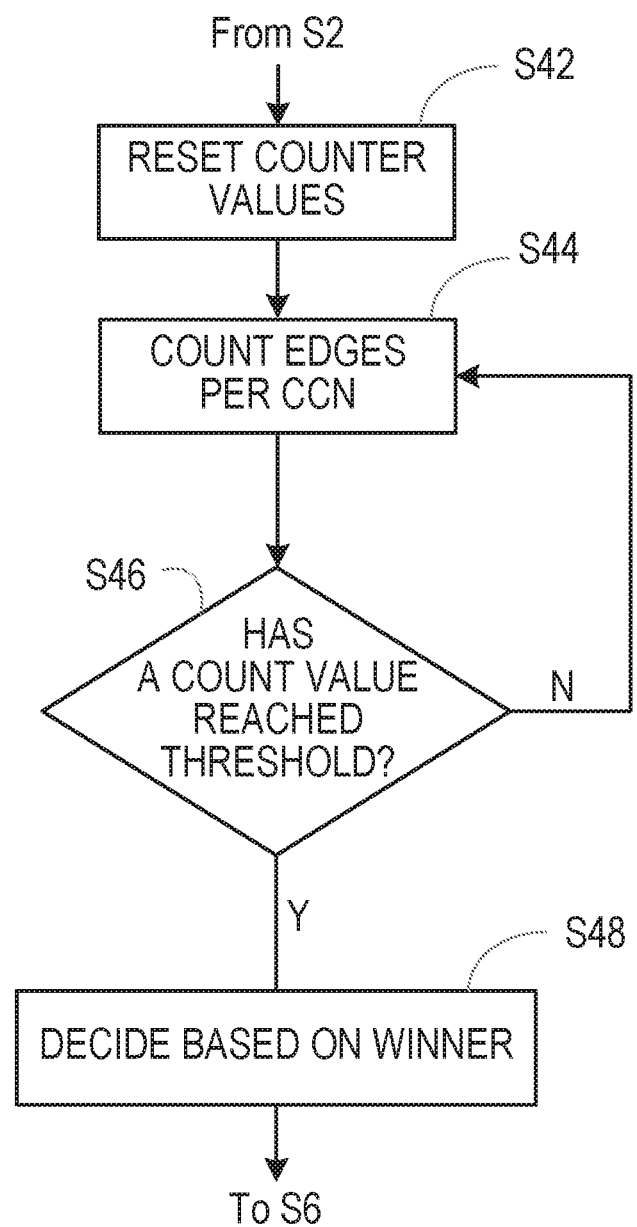

FIG. 11 is a schematic diagram of a detailed implementation of step S4 of method 900. Step S4 in this implementation comprises steps S42 to S48.

In step S42, counter values of edge counters (such as edge counters 510 and 520 of FIG. 6) are reset and the method then proceeds to step S44 in which signal edges experience at the clock-candidate nodes are counted per such node using the edge counters. The method then proceeds to step S46 in which it is waited until one of the counters reaches a given threshold value. Until this happens (S46, NO), the counting continues in step S44. As soon as one of the counters reaches the given threshold value (S46, YES), the protocol currently in use is decided in step S48 (i.e. based on for which clock-candidate node the counter reached the given threshold value first).

Incidentally, returning to FIG. 10, the repeated monitoring and deciding which may be carried out in step S10 in line with FIG. 6 need not continue during the full operation of the communication circuitry concerned. For example, if a given number of repetitions do not require the method to proceed to step S12, the method 900 may terminate with the communication circuitry continuing communication with the latched communication protocol without continuing the verification. If, later, it is found that communication under the decided communication protocol has failed (e.g. a given signature or pattern in the communication is not spotted, or there is a failure at application level), the method 900 may be restarted at step S2 or S10.

Incidentally, with the SLIMbus® protocol, it is possible to have logic transitions on the data line without the clock line toggling prior to starting "normal" communications under the protocol. In this case, the ability to repeatedly verify a decision as in step S10 is useful (e.g. to handle the CheckingDataLine state in that protocol).

Figure 12:
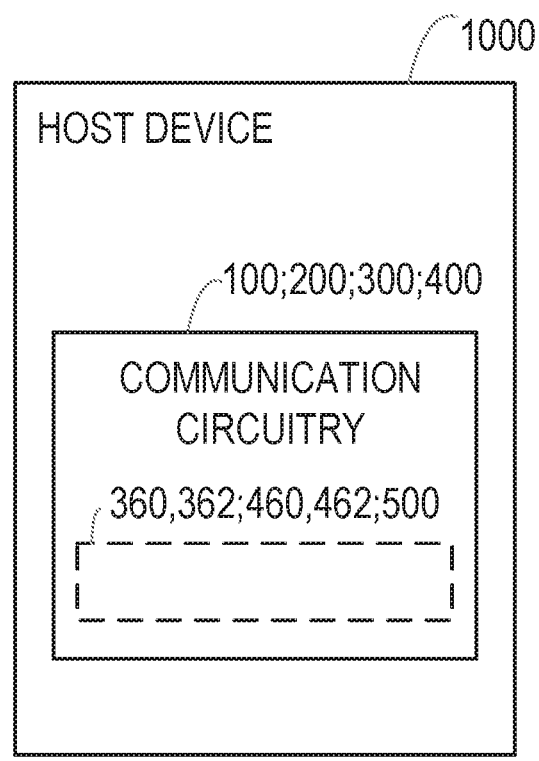
FIG. 12 is a schematic diagram of a host device embodying the present invention.

As mentioned previously, communication circuitry (and control circuitry) disclosed herein may be implemented in a host device. FIG. 12 is a schematic diagram of an electrical or electronic device 1000, which may be considered such a host device. Device 1000 comprises any of the communication circuitry and control circuitry disclosed herein.

One advantage of the present invention is that use of the described communication circuitry may be provided as the only communication interface provided on a device, without the need for any additional pins or communication control devices. For example, the above control circuitry may effectively appear invisible to the communication interface, with an external device simply operating under a given protocol and the local device responding by detecting that protocol "automatically" (without needing parallel control data channels) and communicating under that protocol.

The skilled person will recognise that some aspects of the above described apparatus (circuitry) and methods may be embodied as processor control code, for example on a non-volatile carrier medium such as a disk, CD- or DVD-ROM, programmed memory such as read only memory (Firmware), or on a data carrier such as an optical or electrical signal carrier. For example, the control circuitry such as control circuitry 500 of FIG. 6 may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Some embodiments of the present invention may be arranged as part of an audio processing circuit, for instance an audio circuit (such as a codec or the like) which may be provided in a host device as discussed above. A circuit or circuitry according to an embodiment of the present invention may be implemented as an integrated circuit (IC), for example on an IC chip. One or more input or output transducers may be connected to the integrated circuit in use.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

The invention claimed is:

1. An integrated circuit, the integrated circuit comprising:
   N communication nodes being clock-candidate nodes, where N≥2;
   N communication units for communication using respective communication protocols, and connected or connectable to receive respective clock signals for communication under their respective communication protocols via respective said clock-candidate nodes; and
   a control unit configured, in a decision operation, to monitor the clock-candidate nodes and decide which of the communication protocols is in use dependent on at which of the clock-candidate nodes a received clock signal is detected,
   wherein at least one said communication unit is connected or connectable to receive and/or transmit data under its respective communication protocol via at least one said clock-candidate node other than the clock-candidate node via which that communication unit is to receive its respective clock signal.

2. The integrated circuit as claimed in claim 1, wherein the control unit is configured to decide that a particular one of the communication protocols is in use if a clock signal is detected at the clock-candidate node via which the communication unit for that communication protocol is connectable to receive its respective clock signal.

3. The integrated circuit as claimed in claim 1, wherein the control unit is configured to:
   enable or keep enabled or connect for use the communication unit for which it is decided that its communication protocol is in use; and/or
   not enable, disable, keep disabled or disconnect each said communication unit other than the communication unit for which it is decided that its communication protocol is in use.

4. The integrated circuit as claimed in claim 1, wherein the control unit is configured to connect the communication unit for which it is decided that its communication protocol is in use to at least one said clock-candidate node, other than the clock-candidate node via which that communication unit is connectable to receive its respective clock signal, to receive and/or transmit data under its respective communication protocol.

5. The integrated circuit as claimed in claim 1, wherein the control unit is configured to monitor the clock-candidate nodes by detecting signal edges at one or more of the clock-candidate nodes.

6. The integrated circuit as claimed in claim 1, wherein the control unit is configured to detect that a clock signal is received at one of the clock-candidate nodes based on how many signal edges are detected in the decision operation at said one or more of the clock-candidate nodes.

7. The integrated circuit as claimed in claim 1, wherein the control unit is configured in the decision operation to count signal edges detected at one or more of the clock-candidate nodes, and detect that a clock signal is received at one of the clock-candidate nodes if the number of signal edges detected at that clock-candidate node reaches a threshold value.

8. The integrated circuit as claimed in claim 7, wherein the control unit is configured in the decision operation to detect that a clock signal is received at one of the clock-candidate nodes if the number of signal edges detected at that clock-candidate node reaches the threshold value before the number of signal edges detected at each other clock-candidate node reaches the threshold value.

9. The integrated circuit as claimed in claim 1, wherein the control unit is configured in the decision operation to count signal edges detected at some or all of the clock-candidate nodes, and detect that a clock signal is received at one of those clock-candidate nodes based on a comparison between or a mathematical operation performed on the number of signal edges counted for those clock-candidate nodes.

10. The integrated circuit as claimed in claim 1, wherein the control unit is configured in the decision operation to count signal edges detected at some or all of the clock-candidate nodes, and detect that a clock signal is received at the one of those clock-candidate nodes for which the higher or highest number of edges is detected.

11. The integrated circuit as claimed in claim 1, wherein the control unit is configured to detect that a clock signal is received at one of the clock-candidate nodes based on how many signal edges are detected in a decision period corresponding to the decision operation.

12. The integrated circuit as claimed in claim 1, wherein each said communication unit is connected to receive and/or transmit data under its respective communication protocol via one or more said clock-candidate nodes other than the clock-candidate node via which that communication unit is connected to receive its respective clock signal.

13. The integrated circuit as claimed in claim 1, wherein at least one of said communication units is connected to receive and/or transmit data under its respective communication protocol via one or more communication nodes of the integrated circuit other than the clock-candidate nodes.

14. The integrated circuit as claimed in claim 1, wherein the control unit is configured to repeat said monitoring and deciding in one or more subsequent decision operations to decide if the communication protocol in use has changed.

15. The integrated circuit as claimed in claim 14, wherein the control unit is configured to repeat said monitoring and deciding in one or more subsequent decision operations if it is determined that the existing decision as to which of the communication protocols is in use is no longer valid.

16. The integrated circuit as claimed in claim 14, wherein the control unit is configured to cease repeating said monitoring and deciding if it is determined that the existing decision as to which of the communication protocols is in use is correct.

17. The integrated circuit as claimed in claim 14, wherein the control unit is configured to change which communication unit is enabled or connected for use if it is decided that the communication protocol in use has changed.

18. The integrated circuit as claimed in claim 1, wherein the control unit comprises a detection unit operable to detect a predetermined signal signature at one or more of the clock-candidate nodes or at one or more communication nodes of the integrated circuit other than the clock-candidate nodes, and is operable to control when a said decision operation occurs and/or which clock-candidate nodes are monitored in that decision operation if the signal signature is detected.

19. The integrated circuit as claimed in claim 1, wherein the communication nodes are:
   external nodes of the integrated circuit; and/or
   connection pins of the integrated circuit.

20. Control circuitry for use in an integrated circuit, the integrated circuit comprising N communication nodes being clock-candidate nodes, where N≥2, and N communication units for communication using respective communication protocols, and connected or connectable to receive respective clock signals for communication under their respective communication protocols via respective said clock-candidate nodes, wherein at least one said communication unit is connected or connectable to receive and/or transmit data under its respective communication protocol via at least one said clock-candidate node other than the clock-candidate node via which that communication unit is to receive its respective clock signal,
   the control circuitry being configured, in a decision operation, to monitor the clock-candidate nodes and decide which of the communication protocols is in use dependent on at which of the clock-candidate nodes a received clock signal is detected.

21. A method of controlling an integrated circuit, the integrated circuit comprising N communication nodes being clock-candidate nodes, where N≥2, and N communication units for communication using respective communication protocols, and connected or connectable to receive respective clock signals for communication under their respective communication protocols via respective said clock-candidate nodes, wherein at least one said communication unit is connected or connectable to receive and/or transmit data under its respective communication protocol via at least one said clock-candidate node other than the clock-candidate node via which that communication unit is to receive its respective clock signal, the method comprising, in a decision operation, monitoring the clock-candidate nodes and deciding which of the communication protocols is in use dependent on at which of the clock-candidate nodes a received clock signal is detected.

22. A host device comprising an integrated circuit, the integrated circuit comprising:
   N communication nodes being clock-candidate nodes, where N≥2;
   N communication units for communication using respective communication protocols, and connected or connectable to receive respective clock signals for communication under their respective communication protocols via respective said clock-candidate nodes; and
   a control unit configured, in a decision operation, to monitor the clock-candidate nodes and decide which of the communication protocols is in use dependent on at which of the clock-candidate nodes a received clock signal is detected,
   wherein at least one said communication unit is connected or connectable to receive and/or transmit data under its respective communication protocol via at least one said clock-candidate node other than the clock-candidate node via which that communication unit is to receive its respective clock signal.

23. A communication circuit, comprising:
   N signal-line nodes being clock-candidate nodes, where N≥2;
   N communication units for communication using respective communication protocols, and connected or connectable to receive respective clock signals for communication under their respective communication protocols via respective said clock-candidate nodes; and
   a control unit configured, in a decision operation, to monitor the clock-candidate nodes and decide which of the communication protocols is in use dependent on at which of the clock-candidate nodes a received clock signal is detected,
   wherein at least one said communication unit is connected or connectable to receive and/or transmit data under its respective communication protocol via at least one said clock-candidate node other than the clock-candidate node via which that communication unit is to receive its respective clock signal.

* * * * *